(12) United States Patent
Gotoh et al.

(10) Patent No.: US 11,405,406 B2
(45) Date of Patent: Aug. 2, 2022

(54) FRAUDULENT TRANSMISSION DATA DETECTION DEVICE, FRAUDULENT TRANSMISSION DATA DETECTION METHOD, AND STORAGE MEDIUM

(71) Applicant: TOYOTA JIDOSHA KABUSHIKI KAISHA, Toyota (JP)

(72) Inventors: Keita Gotoh, Toyota (JP); Yusuke Sato, Toyota (JP); Shinichi Iiyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 16/805,929

(22) Filed: Mar. 2, 2020

(65) Prior Publication Data

US 2020/0287911 A1  Sep. 10, 2020

(30) Foreign Application Priority Data

Mar. 5, 2019 (JP) .............................. JP2019-039702

(51) Int. Cl.
*H04L 9/40* (2022.01)
*H04L 12/40* (2006.01)
*H04L 65/40* (2022.01)
*H04L 67/62* (2022.01)

(52) U.S. Cl.
CPC ............. *H04L 63/12* (2013.01); *H04L 12/40* (2013.01); *H04L 63/1416* (2013.01); *H04L 65/40* (2013.01); *H04L 67/62* (2022.05); *H04L 2012/40215* (2013.01)

(58) Field of Classification Search
None
See application file for complete search history.

(56) References Cited

U.S. PATENT DOCUMENTS

| | | | |
|---|---|---|---|
| 2016/0205194 A1* | 7/2016 | Kishikawa | H04L 67/12 726/1 |
| 2016/0297401 A1* | 10/2016 | Haga | H04L 9/0891 |
| 2018/0048663 A1 | 2/2018 | Yura et al. | |
| 2019/0238586 A1 | 8/2019 | Hong et al. | |
| 2019/0312895 A1* | 10/2019 | Fujimura | H04L 12/40 |
| 2019/0349394 A1* | 11/2019 | Kishikawa | H04L 63/123 |

FOREIGN PATENT DOCUMENTS

| | | |
|---|---|---|
| EP | 3282646 A1 | 2/2018 |
| JP | 2018-026663 A | 2/2018 |
| KR | 101754951 B1 | 7/2017 |

* cited by examiner

*Primary Examiner* — Robert M Morlan
(74) *Attorney, Agent, or Firm* — Oliff PLC

(57) ABSTRACT

A fraudulent transmission data detection device includes: a receiving unit that receives data that is transmitted in cycles; and plural determination units, each of which is configured to, based on whether or not a time from a reference timing until a predetermined number of data items are received by the receiving unit is less than a predetermined time, determine whether or not fraudulent transmission data is contained in the received data, and in which at least the reference timing, or the predetermined number of data items and the predetermined time, are different from those of the other determination units.

13 Claims, 8 Drawing Sheets

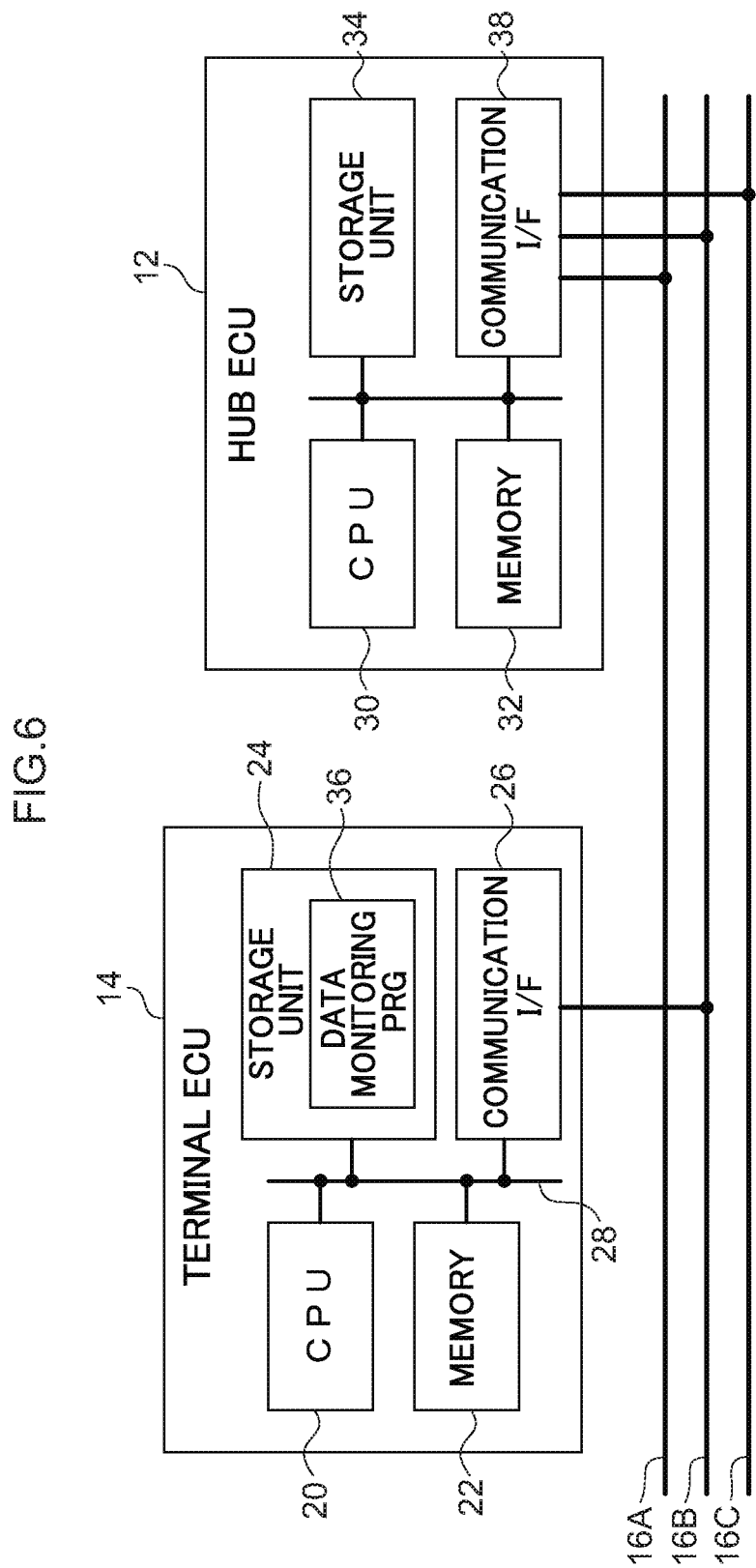

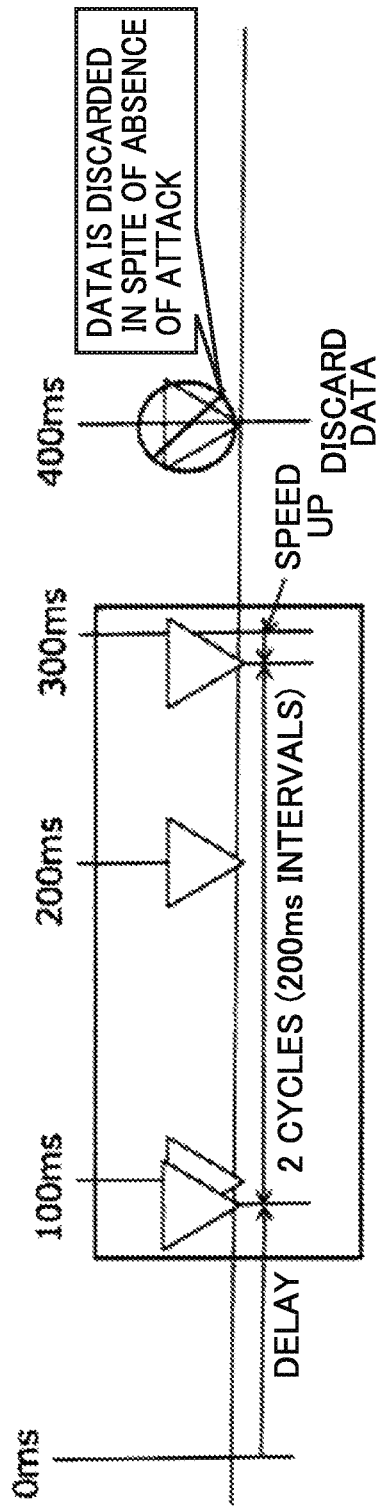

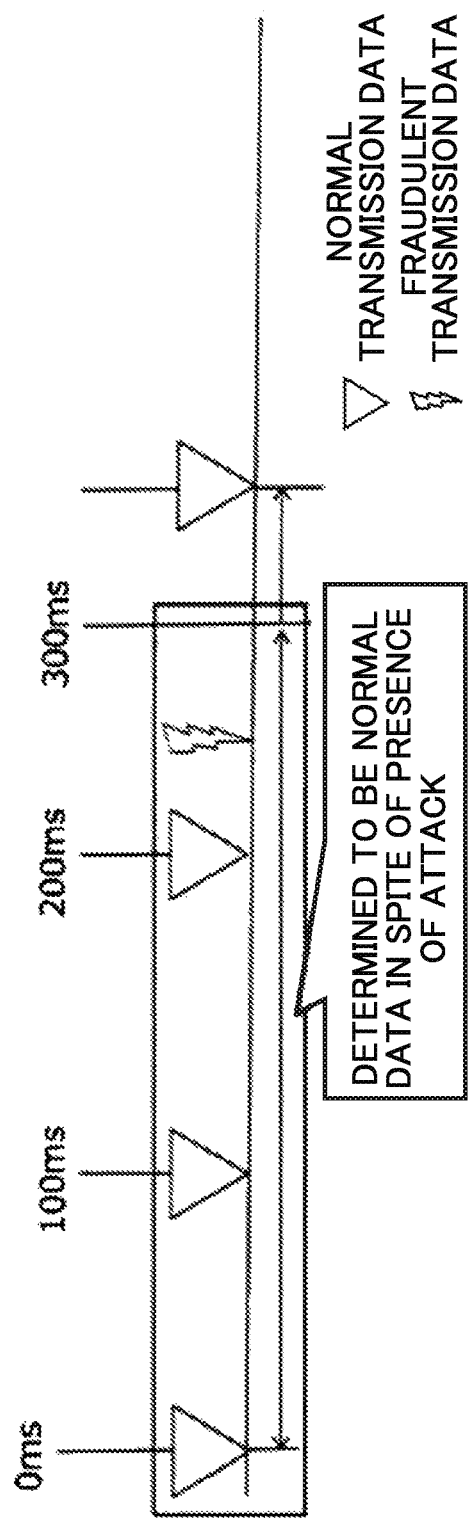

FRAUDULENT TRANSMISSION DATA DETECTION DEVICE, FRAUDULENT TRANSMISSION DATA DETECTION METHOD, AND STORAGE MEDIUM

CROSS-REFERENCE TO RELATED APPLICATION

This application is based on and claims priority under 35 USC 119 from Japanese Patent Application No. 2019-039702 filed on Mar. 5, 2019, the disclosure of which is incorporated by reference herein.

BACKGROUND

Technical Field

The present disclosure relates to a fraudulent transmission data detection device, a fraudulent transmission data detection method, and a storage medium.

Related Art

Japanese Patent Application Laid-open (JP-A) No. 2018-026663 discloses technology that, each time a message that is to be monitored is received, determines, based on a current reception timing Ti, a reception timing m number of times previously Ti-m, a message transmission cycle F, and a predetermined constant σ, whether or not a fraudulent transmission is present in the received monitored message during a period from the reception timing Ti-m to the reception timing Ti.

The technology described in JP-A No. 2018-026663 determines that data that is received in a shorter time interval than the data (i.e., message) transmission cycle F is fraudulent transmission data. However, in communication that complies with a Standard such as, for example, CAN (Controller Area Network), which is a communication protocol for automobiles and industrial machinery, and the like, fluctuations do occur in the reception time intervals even if the data is normal data, and an incorrect determination may be made due to the effects of these fluctuations in the reception time intervals.

As an example, FIGS. 7A and 7B illustrate cases in which, in normal operations, normal data is received every 100 ms. FIG. 7A illustrates an example in which the reception of normal data, which conventionally should be received at 0 ms timings, is delayed due to some reason or other to timings of close to 100 ms, and in which the reception of normal data, which conventionally should be received at 300 ms timings, is slightly sped up due to some reason or other. In this case, because data is received four times within a period of 200 ms, which corresponds to two cycles of normal data, it is incorrectly determined that fraudulent transmission data has been received, and there is a possibility that the notation 'data discarded in spite of the absence of an attack' will be shown, and that this normal data will be incorrectly discarded.

FIG. 7B illustrates an example in which fraudulent transmission data is received at timings between 200 ms and 300 ms, and in which the reception of normal data, which conventionally should be received at 300 ms timings, is delayed due to some reason or other. In this case, because data is received four times within a period of 200 ms, which corresponds to three cycles of the normal data, there is a possibility that the notation 'data determined to be normal in spite of the presence of an attack' will be shown, and that in spite of the fact that fraudulent transmission data has been received, this data will be incorrectly determined to be normal.

SUMMARY

The present disclosure has been conceived in view of the above-described circumstances, and provides a fraudulent transmission data detection device, a fraudulent transmission data detection method, and a storage medium that enable incorrect determinations relating to receptions of fraudulent transmission data that are caused by the effects of fluctuations in the reception time intervals of normal data to be inhibited from occurring.

A first aspect of the present disclosure is a fraudulent transmission data detection device that includes a receiving unit that receives data that is transmitted in cycles; and plural determination units, each of which is configured to, based on whether or not a time from a reference timing until a predetermined number of data items are received by the receiving unit is less than a predetermined time, determine whether or not fraudulent transmission data is contained in the received data, and in which at least the reference timing, or the predetermined number of data items and the predetermined time, are different from those of the other determination units.

In the above-described aspect, plural determination units that determine whether or not fraudulent transmission data is contained in received data are provided, and at least one of the predetermined number of data items and predetermined times in the determination of the fraudulent transmission data, or the reference timings is mutually different from each other in these plural determination units. In this way, by providing plural determination units whose determination criteria for determining fraudulent transmission data are mutually different, even if fluctuations occur in the normal data reception time intervals, because it is likely that a correct determination result will be obtained in at least one of the plural determination units, it is possible to inhibit incorrect determinations about receptions of fraudulent transmission data from occurring.

In the first aspect, the plural determination units may include: a first determination unit that, based on whether or not a time, from a reference timing until a first predetermined number of data items are received by the receiving unit, is less than a first predetermined time, determines whether or not fraudulent transmission data is contained in the received data; and a second determination unit that, based on whether or not a time, from the reference timing until a second predetermined number of data items, which is different from the first predetermined number of data items, are received by the receiving unit, is less than a second predetermined time that is different from the first predetermined time, determines whether or not fraudulent transmission data is contained in the received data.

In the above-described structure the predetermined number of data items and the predetermined timings in the determination as to whether or not fraudulent transmission data is contained in received data are different between the first determination unit and the second determination unit.

When the predetermined time is comparatively short and, in accordance with this, the predetermined number of data items is comparatively fewer, then it is possible to detect the reception of fraudulent transmission data at high speed when fraudulent transmission data is received at a high frequency in a short space of time. In contrast, when the predetermined time is comparatively long and, in accordance with this, the predetermined number of data items is comparatively greater, then it is also possible to detect the reception of fraudulent transmission data when fraudulent transmission data is received at a low frequency over a longer space of time. Accordingly, even if fluctuations do occur in the reception time intervals of normal data, because it is likely that a correct determination result will be obtained in the first determination unit or the second determination unit, it is possible to inhibit incorrect determinations relating to the reception of fraudulent transmission data from occurring.

In the first aspect, the plural determination units may include: a first determination unit that, based on whether or not a time, from a first reference timing until a first predetermined number of data items are received by the receiving unit, is less than a first predetermined time, determines whether or not fraudulent transmission data is contained in the received data; and a third determination unit that, based on whether or not a time, from a second reference timing, which is different from the first reference timing, of the first determination unit until the first predetermined number of data items are received by the receiving unit, is less than the first predetermined time, determines whether or not fraudulent transmission data is contained in the received data.

In the above-described structure the reference timings in the determination as to whether or not fraudulent transmission data is contained in received data are different between the first determination unit and the third determination unit. In this way, by providing plural determination units having mutually different reference timings, even if temporary fluctuations occur in the normal data reception time intervals, because it is likely that at least one of the determination units will be able to make a determination within a period in which the effects of the fluctuations are reduced, it is possible to inhibit incorrect determinations relating to the reception of fraudulent transmission data from occurring.

The first aspect may further include a control unit that, in a case in which it is determined by one of the plural determination units that fraudulent transmission data is contained in the received data, transition to safety control so as to inhibit any effects from the fraudulent transmission data.

In the above-described structure, in a case in which it is determined in one of the plural determination units that fraudulent transmission data is contained in the received data, a control unit transitions to performing safety control. Therefore, it is possible to inhibit any effects from the fraudulent transmission data.

In the first aspect, the plural determination units and the control unit may be provided in a hub ECU to which are connected plural communication buses, and, in a case in which it is determined by one of the plural determination units that fraudulent transmission data is contained in the received data, the safety control may be performed with respect to the communication bus to which the fraudulent transmission data has been transmitted.

In the above-described structure, because the plural determination units and the control unit are provided in a hub ECU, and determinations relating to fraudulent transmission data and the like are performed in the hub ECU, there is no need to alter the structure of any instruments other than the hub ECU when the present disclosure is implemented, so the present disclosure may be applied easily.

In the first aspect, the plural determination units and the control unit may be provided at a terminal ECU to which is connected a single communication bus, and, in a case in which it is determined by one of the plural determination units that fraudulent transmission data is contained in the received data, the safety control is performed with respect to the terminal ECU at which the control unit is itself provided.

In the above-described structure, because the plural determination units and the control unit are provided in a terminal ECU, and determinations relating to fraudulent transmission data and the like are made in the terminal ECU, it is possible to reduce the load on the hub ECU.

In the first aspect, the data that is transmitted in cycles may be transmitted via communication compliant with CAN.

In an environment in which communication that is compliant with CAN is performed, it is easy for fluctuations to consistently occur in normal data reception time intervals. In the above-described structure, in this kind of environment, it is possible to inhibit incorrect determinations relating to the reception of fraudulent transmission data from occurring.

A second aspect of the present disclosure is A fraudulent data transmission method, including: receiving data that is transmitted in cycles; providing plural determination circuits, each of which is configured to determine whether or not fraudulent transmission data is contained in the received data, based on whether or not a time from a reference timing until a predetermined number of data items are received is less than a predetermined time; and causing at least the reference timing, or the predetermined number of data items and the predetermined time, to be different at each of the plural determination circuits.

A third aspect of the present disclosure is a non-transitory storage medium storing a program that causes a computer to execute fraudulent data detection processing, the fraudulent data detection processing including: receiving data that is transmitted in cycles; providing plural determination circuits, each of which is configured to, based on whether or not a time, from a reference timing until a predetermined number of data items are received, is less than a predetermined time, determine whether or not fraudulent transmission data is contained in the received data; and causing at least the reference timing, or the predetermined number of data items and the predetermined time, to be different at each of the plurality of determination circuits.

The present disclosure enables incorrect determinations relating to receptions of fraudulent transmission data that are caused by the effects of fluctuations in the reception time intervals of normal data to be inhibited from occurring.

BRIEF DESCRIPTION OF THE DRAWINGS

Exemplary embodiments of the present disclosure will be described in detail based on the following figures, wherein:

FIG. 6 is a block diagram illustrating another example of a hardware structure of a hub ECU and a terminal ECU; and FIGS. 7A and 7B are timing charts for illustrating problems in the conventional technology.

DETAILED DESCRIPTION

Hereinafter, an example of an exemplary embodiment for implementing the present disclosure will be described in detail with reference to the drawings. A vehicle on-board network 10 illustrated in FIG. 1 includes plural electronic control units (hereinafter, referred to as 'ECU') 12, 14A, 14B, 14C, 14D, 4DE, and 14F that are mounted in a vehicle, and is configured such that these ECU are each connected to at least one of a first communication bus 16A, a second communication bus 16B, or a third communication bus 16C. In this vehicle on-board network 10, each ECU performs communication that is compliant with CAN, and data (i.e., messages) are transmitted and received approximately at each transmission cycle T. Note that the data transmission cycle T varies for each data ID (in the present exemplary embodiment this is a CAN ID).

Figure 1:
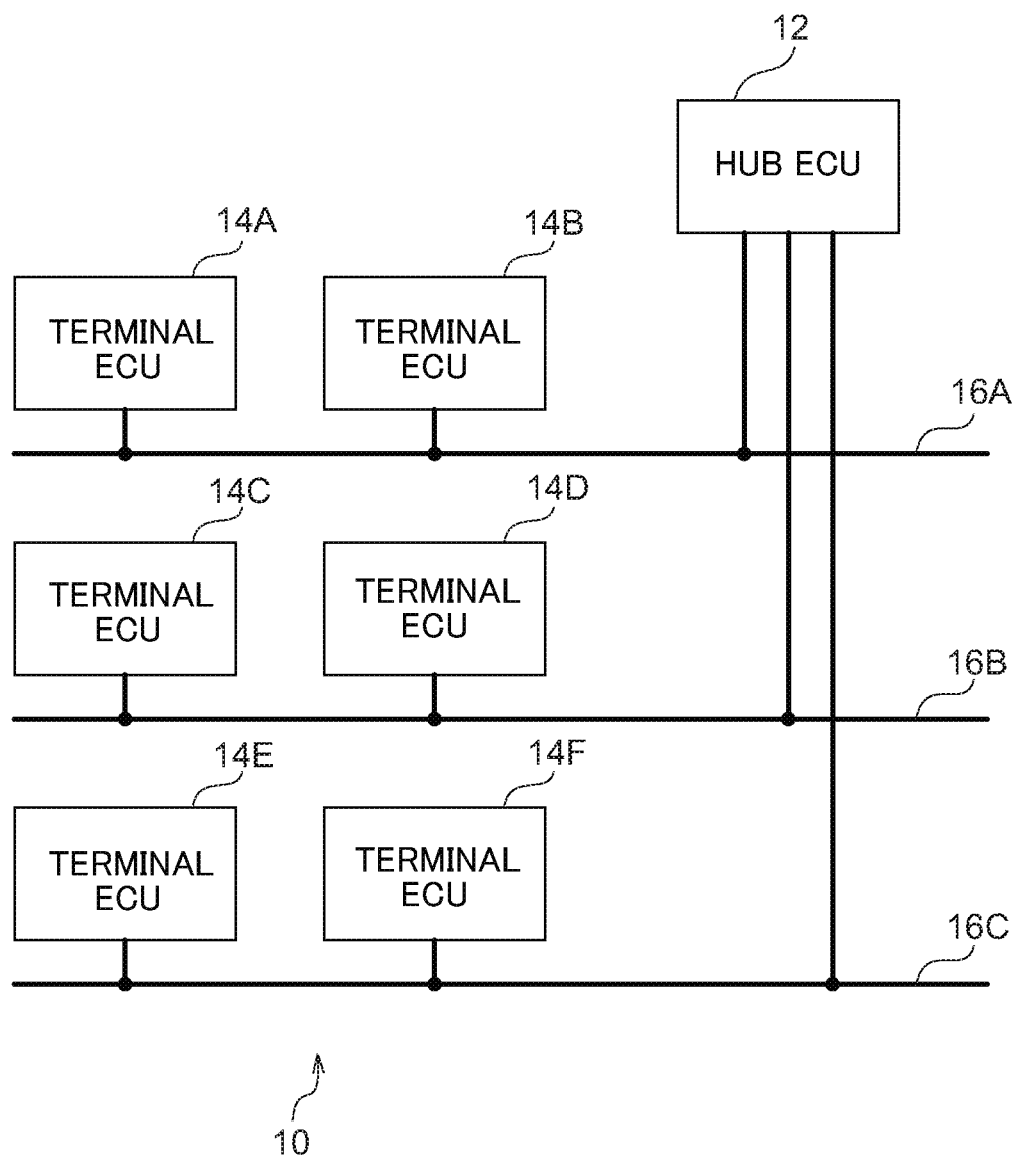
FIG. 1 is a schematic block diagram illustrating a vehicle on-board network according to an exemplary embodiment.

In the example illustrated in FIG. 1, the ECU 14A and 14B are connected to the first communication bus 16A, the ECU 14C and 14D are connected to the second communication bus 16B, and the ECU 14E and 14F are connected to the third communication bus 16C. In the present exemplary embodiment, as is described above, where necessary, the ECU that are each connected to a single bus are collectively described as 'terminal ECU 14'.

In contrast, the ECU 12 is connected to the first communication bus 16A, the second communication bus 16B, and the third communication bus 16C, respectively. In the present exemplary embodiment, where necessary, the ECU 12 is described as a 'hub ECU 12. When a terminal ECU 14 that is connected to a particular communication bus 16 transmits data to a terminal ECU 14 that is connected to another communication bus 16, the transfer of that data is performed by the hub ECU 12.

Note that, in FIG. 1, the terminal ECU 14 and the hub ECU 12 are illustrated as components of the vehicle on-board network 10, however, the present disclosure is not limited to this, and it is also possible for a sensor unit or the like which is formed by adding a communication control unit to various types of sensor to also be connected to the communication bus 16.

Figure 2:
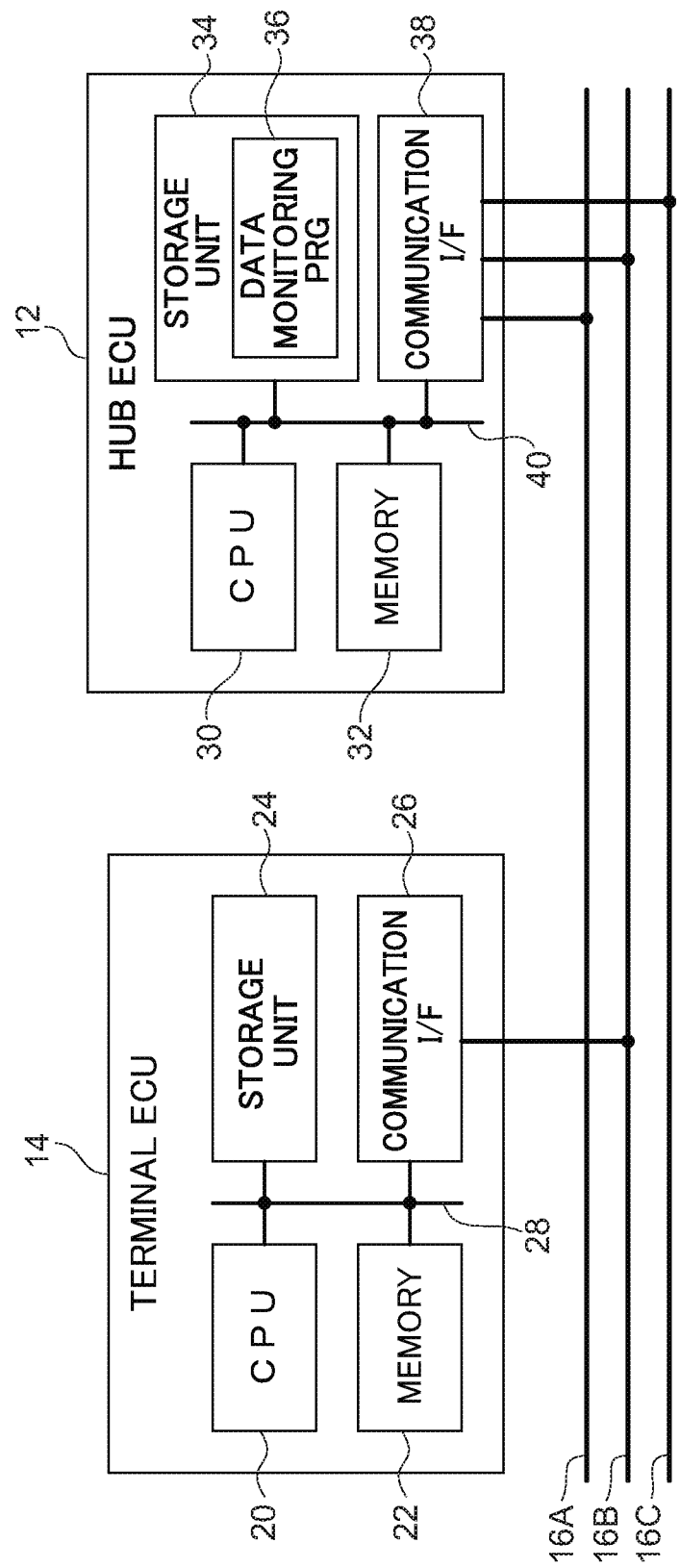
FIG. 2 is a block diagram illustrating an example of a hardware structure of a hub ECU and a terminal ECU.

As illustrated in FIG. 2, the terminal ECU 14 include a Central Processing Unit (CPU) 20, memory 22 such as Read Only Memory (ROM) and Random Access Memory (RAM), a non-volatile storage unit 24 such as a Hard Disk Drive (HDD) or a Solid State Drive (SSD), and a communication Interface (I/F) 26. The CPU 20, the memory 22, the storage unit 24, and the communication I/F 26 are mutually connected together so as to be able to communicate with each other via an internal bus 28, and the communication I/F 26 is connected to a communication bus 16 (i.e., the second communication bus 16B in FIG. 2).

The hub ECU 12 includes a CPU 30, memory 32 such as ROM and RAM, a non-volatile storage unit 34 such as an HDD or an SSD, and a communication I/F 38. The CPU 30, the memory 32, the storage unit 34, and the communication I/F 38 are mutually connected together so as to be able to communicate with each other via an internal bus 40, and the communication I/F 38 is connected to each one of the first communication bus 16A, the second communication bus 16B, and the third communication bus 16C.

Figure 3:
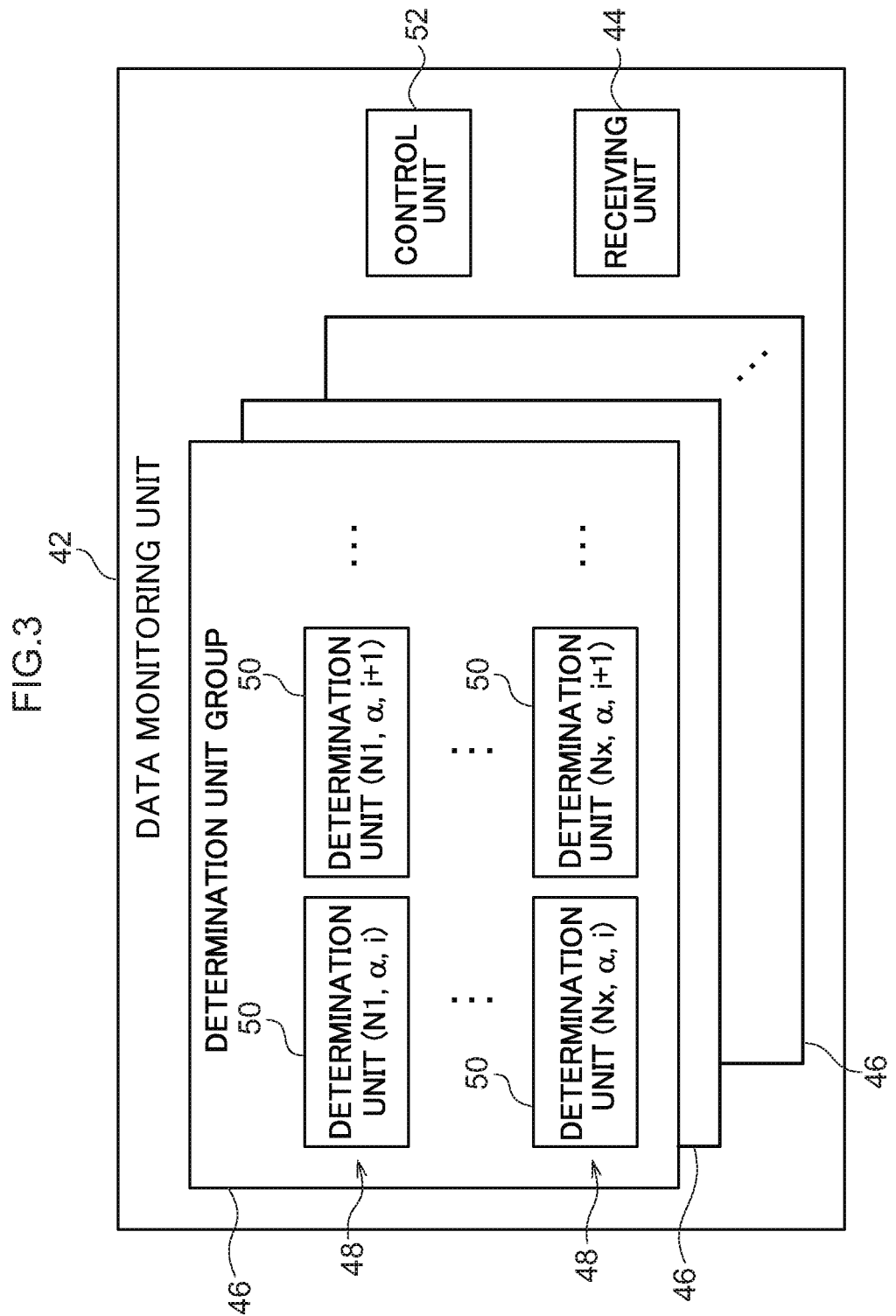
FIG. 3 is a block diagram illustrating the structure of a data monitoring unit.

A data monitoring program 36 is stored in the storage unit 34. As a result of the data monitoring program 36 being read from the storage unit 34 and loaded on the memory 32, and the data monitoring program 36 that has been loaded to the memory 32 then being executed by the CPU 30, the hub ECU 12 functions as a data monitoring unit 42 illustrated in FIG. 3. The data monitoring unit 42 includes a receiving unit 44, plural determination unit groups 46, and a control unit 52. In this way, the hub ECU 12 is an example of a fraudulent transmission data detection device.

Each time the hub ECU 12 receives data to be monitored, the receiving unit 44 associates the reception timing of that data with an ID (in the present exemplary embodiment this is a CAN ID) for that data, and records the result as reception data information.

The plural determination unit groups 46 are groups formed by plural determination units 50 that use mutually different determination criteria to determine whether or not fraudulent transmission data is contained in the data being monitored received by the receiving unit 44. The determination units 50 belonging to the different determination unit groups 46 take data items having mutually different ID as their subjects for monitoring.

Each of the determination units 50 determines whether or not fraudulent transmission data is contained in the received data based on whether or not the time from a reference timing until a predetermined number $(N+\alpha)$ of data items are received by the receiving unit 44 is less than a predetermined time $(N \times T)$. A single determination unit group 46 contains plural determination unit rows 48 that each have mutually different constants $N$, $\alpha$ that designate a predetermined number and a predetermined time. Additionally, a single determination unit row 48 contains plural determination units 50 that each have mutually different constants $i$ that designate a reference timing. The individual determination units 50 contained in the plural determination unit groups 46 operate in parallel with each other.

Note that the plural determination units 50 that are contained in the same determination unit group 46 and whose determination unit rows 48 are mutually different from each other are examples of a first determination unit and a second determination unit. Additionally, the plural determination units 50 that are contained in the same determination unit group 46 and whose determination unit rows 48 are the same as each other, but whose reference timings are mutually different from each other are examples of a first determination unit and a third determination unit. In addition, $N$ is an example of a predetermined time, while $n+\alpha$ is an example of a predetermined number of items.

When it is determined by one of the determination units 50 contained in the plural determination unit groups 46 that fraudulent transmission data is contained in received data, the control unit 52 transitions to safety control in which the effects from the fraudulent transmission data are inhibited. An example of safety control in the present exemplary embodiment is control to discard the reception data for the ID corresponding to the fraudulent transmission data, and to render the communication bus 16 to which the fraudulent transmission data was transmitted temporarily unusable.

Figure 4:
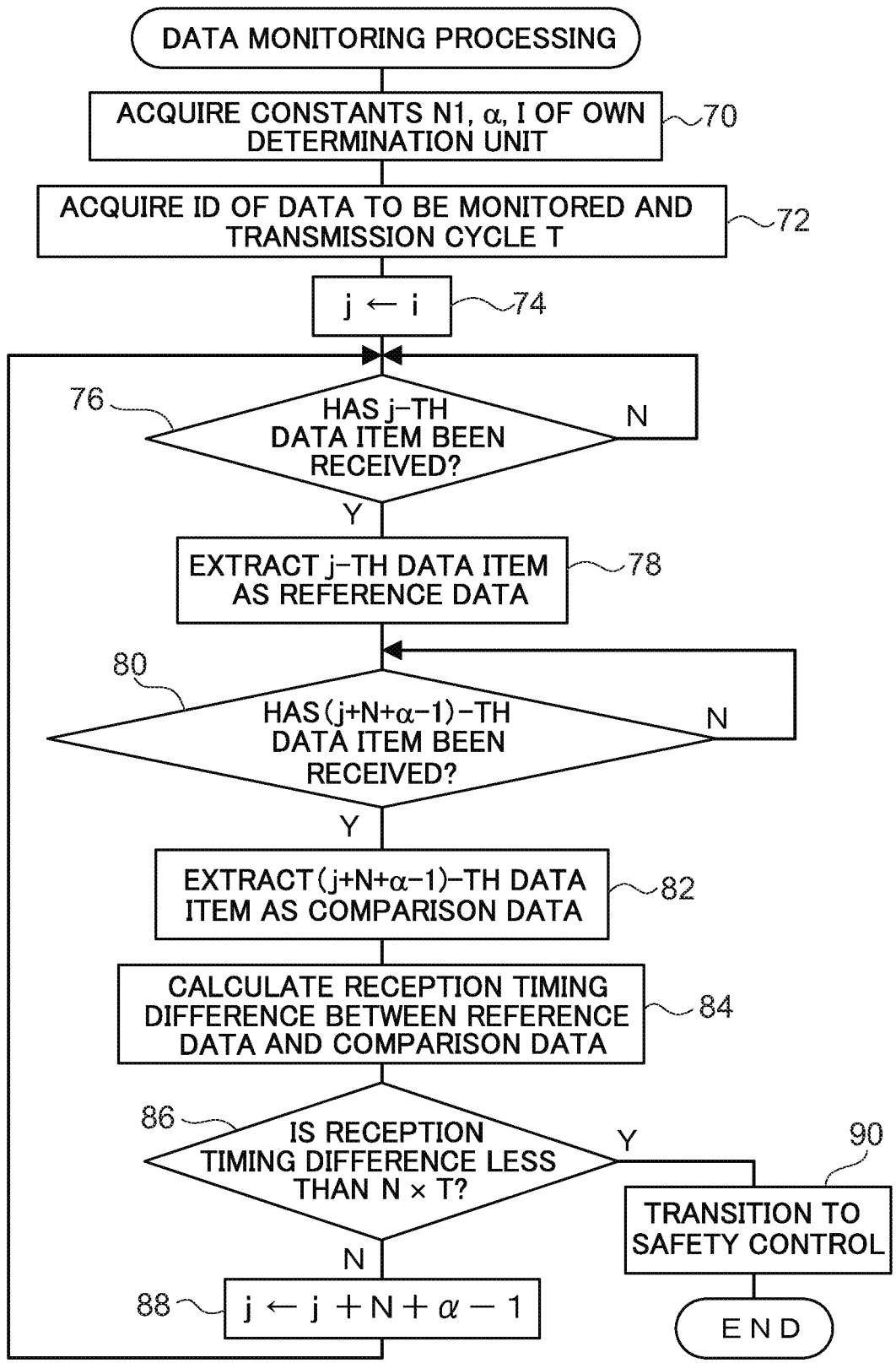
FIG. 4 is a flowchart illustrating data monitoring processing.

Next, data monitoring processing executed by the individual determination units 50 will be described with reference to FIG. 4. In step 70 of this data monitoring processing, each determination unit 50 acquires the constants $N$, $\alpha$, $i$ that have been set in advance for itself. In step 72, each determination unit 50 acquires the ID and a transmission cycle T of the data being monitored. In step 74, each determination unit 50 sets the value of the constant $i$ to a variable $j$.

In step 76, the determination units 50 refer to the reception data information recorded by the receiving unit 44, and determine whether or not the j-th data item being monitored has been received. If this determination is negative, step 76 is repeated until the determination is affirmative. If the information (i.e., the ID and reception timing) for the j-th data item being monitored has been recorded as reception data information, then the determination in step 76 is affirmative and the routine moves to step 78. In step 78, the determination units 50 extract a reception timing t1 of the j-th data item being monitored as reference data.

In step 80, each determination unit 50 determines whether or not the (j+N+α−1)-th data item being monitored has been received. If the determination is negative, step 80 is repeated until the determination is affirmative. If the information (i.e., the ID and reception timing) for the (j+N+α−1)-th data item being monitored has been recorded as reception data information, then the determination in step 80 is affirmative and the routine moves to step 82. In step 82, the determination unit 50 extracts a reception timing t2 of the (j+N+α−1)-th data item being monitored as comparative data.

In step 84, the determination unit 50 calculates a reception timing difference Δt (=t2−t1) between the reception of the reference data extracted in step 78 and the reception of the comparison data extracted in step 82. In the next step 86, the determination unit 50 determines whether or not the reception timing difference Δt calculated in step 84 is less than N×T. If the determination in step 84 is negative, then it is determined that fraudulent reception data is not contained in the received data being monitored, and the routine moves to step 88. In step 88, the determination unit 50 replaces the variable j with j+N+α−1, and returns to step 76. As a consequence, the steps from step 76 to step 88 are repeated as long as the determination in step 86 is negative.

If, on the other hand, the determination in step 86 is affirmative, then it is determined that fraudulent reception data is contained in the received data being monitored, and the routine moves to step 90. In step 90, the determination unit 50 notifies the control unit 52 that fraudulent reception data has been detected, and the control unit 52, for example, discards reception data for the ID corresponding to that fraudulent reception data, and also transitions to performing safety control in which the communication bus 16 to which the fraudulent reception data was transmitted is made temporarily unusable.

The above-described data monitoring processing is executed in parallel in the plural determination units 50 using mutually different determination criteria. Operations of the plural determination units 50 contained in the same determination unit group 46 will now be described further using specific numerical examples.

Figure 5:
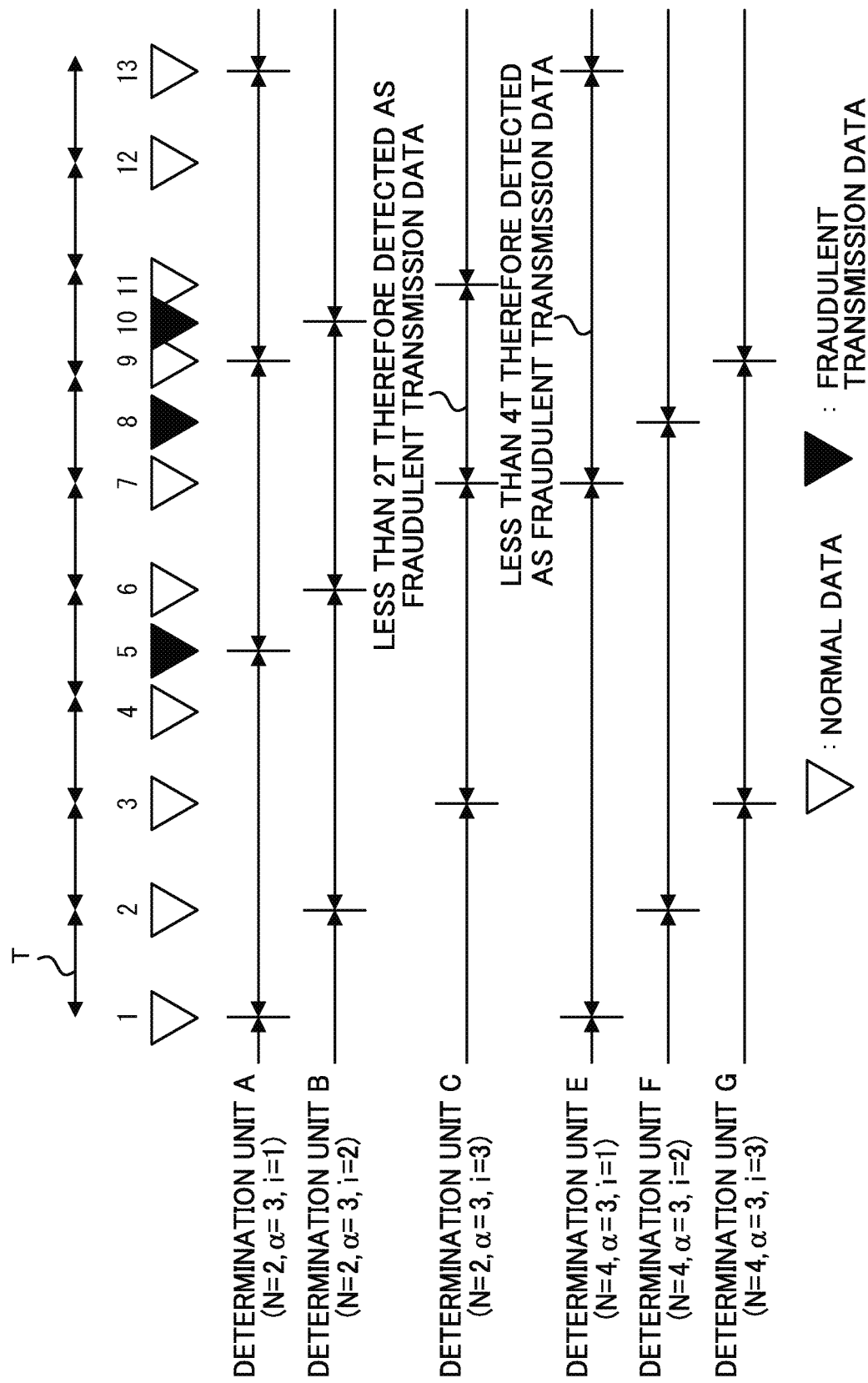
FIG. 5 is a timing chart illustrating processing timings in plural determination units.

FIG. 5 illustrates a specific example of a determination unit A in which N=2, α=3, i=1, a determination unit B in which N=2, α=3, i=2, a determination unit C in which N=2, α=3, i=3, a determination unit D in which N=4, α=3, i=1, a determination unit E in which N=4, α=3, i=2, and a determination unit F in which N=4, α=3, i=3.

In the determination units A to C, because the constants N, α are the same, while the constant i changes, the determination units 50 are contained in the same determination unit row 48, and in the determination units D to F, because the constants N, α are the same, while the constant i changes, the determination units 50 are contained in the same determination unit row 48. In addition, because the constant N in the determination units A to C is different from that in the determination units D to F, the determination units 50 of A to C are contained in a different determination unit row 48 from that of the determination units 50 of D to F.

Operations of the determination unit A will now be described. In the determination unit A, because i=1, j=the first data item is set as the reference data, while because N=2 and α=3, j+N+α−1=the fifth data item is set as the comparison data, and whether or not the reception timing difference Δt between the reception of the first data item and the reception of the fifth data item is less than 2T is determined. Next, the determination unit A sets j=the fifth data item as the reference data, and sets j+N+α−1=5+2+3−1=the ninth data item as the comparison data, and determines whether or not the reception timing difference Δt between the reception of the fifth data item and the reception of the ninth data item is less than 2T.

Next, operations of the determination unit B will be described. In the determination unit B, because i=2, j=the second data item is set as the reference data, while because N=2 and α=3, j+N+α−1=the sixth data item is set as the comparison data, and whether or not the reception timing difference Δt between the reception of the second data item and the reception of the sixth data item is less than 2T is determined. Next, the determination unit B sets j=the sixth data item as the reference data, and sets j+N+α−1=6+2+3−1=the tenth data item as the comparison data, and determines whether or not the reception timing difference Δt between the reception of the sixth data item and the reception of the tenth data item is less than 2T. In this way, in the determination unit B the reference timing is offset by the amount of one cycle of the data items being monitored=T compared with the determination unit A.

Next, operations of the determination unit C will be described. In the determination unit C, because i=3, j=the third data item is set as the reference data, while because N=2 and α=3, j+N+α−1=the seventh data item is set as the comparison data, and whether or not the reception timing difference Δt between the reception of the third data item and the reception of the seventh data item is less than 2T is determined. Next, the determination unit C sets j=the seventh data item as the reference data, and sets j+N+α−1=6+2+3−1=the eleventh data item as the comparison data, and determines whether or not the reception timing difference Δt between the reception of the seventh data item and the reception of the eleventh data item is less than 2T. In this way, in the determination unit C the reference timing is offset by the amount of two cycles of the data items being monitored=2T compared with the determination unit A. Moreover, in the example illustrated in FIG. 1, fluctuations occur in the normal data reception time intervals, and the fifth, eighth, and tenth data items are fraudulent transmission data, however, in the determination of determination unit C, because the reception timing difference Δt between the reception of the seventh data item and the reception of the eleventh data item is less than 2T, the reception of fraudulent transmission data is detected.

Next, operations of the determination unit D will be described. In the determination unit D, because i=1, j=the first data item is set as the reference data, while because N=4 and α=3, j+N+α−1=the seventh data item is set as the comparison data, and whether or not the reception timing difference Δt between the reception of the first data item and the reception of the seventh data item is less than 4T is determined. Next, the determination unit D sets j=the seventh data item as the reference data, and sets j+N+α−1=7+4+3−1=the thirteenth data item as the comparison data, and determines whether or not the reception timing difference Δt between the reception of the seventh data item and the reception of the thirteenth data item is less than 4T. In the determination of determination unit D, because the reception timing difference Δt between the reception of the seventh data item and the reception of the thirteenth data item is less than 4T, the reception of fraudulent transmission data is detected.

Next, operations of the determination unit E will be described. In the determination unit E, because i=2, j=the second data item is set as the reference data, while because N=4 and α=3, j+N+α−1=the eighth data item is set as the comparison data, and whether or not the reception timing difference Δt between the reception of the second data item and the reception of the eighth data item is less than 4T is determined. In this way, in the determination unit B the reference timing is offset by the amount of one cycle of the data items being monitored=T compared with the determination unit A.

Next, operations of the determination unit F will be described. In the determination unit F, because i=3, j=the third data item is set as the reference data, while because N=4 and α=3, j+N+α−1=the ninth data item is set as the comparison data, and whether or not the reception timing difference Δt between the reception of the third data item and the reception of the ninth data item is less than 4T is determined. In this way, in the determination unit F the reference timing is offset by the amount of one cycle of the data items being monitored=2T compared with the determination unit A.

In this way, in the present exemplary embodiment, plural determination units 50 is provided that, based on whether or not a time from a reference timing until a predetermined number of data items are received by the receiving unit 44, which receives data that is transmitted in cycles, is less than a predetermined time, determine whether or not fraudulent transmission data is contained in the received data, and in which at least one of the predetermined number (N+α) of data items and predetermined times (N×T), or the (constants i that designate the) reference timings are mutually different from those of the other determination units 50. In this way, by providing the plural determination units 50 whose determination criteria for determining whether or not fraudulent transmission data is contained in received data are mutually different, even if fluctuations occur in the normal data reception time intervals, because it is likely that a correct determination result will be obtained in at least one of the plural determination units 50, it is possible to inhibit incorrect determinations about receptions of fraudulent transmission data from occurring.

In the present exemplary embodiment, the plural determination units 50 include a determination unit 50 that, based on whether or not a time from a reference timing until a first predetermined number of data items are received by the receiving unit 44 is less than a first predetermined time, determines whether or not fraudulent transmission data is contained in the received data, and a determination unit 50 that, based on whether or not a time from a reference timing until a second predetermined number of data items that is different from the first predetermined number of data items are received by the receiving unit 44 is less than a second predetermined time that is different from the first predetermined time, determines whether or not fraudulent transmission data is contained in the received data. As a result, even if fluctuations occur in the normal data reception time intervals, because it is likely that a correct determination result will be obtained in one of the above-described determination units 50, it is possible to inhibit incorrect determinations about receptions of fraudulent transmission data from occurring.

In the present exemplary embodiment, the plural determination units 50 include a determination unit 50 that, based on whether or not a time from a reference timing until a first predetermined number of data items are received by the receiving unit 44 is less than a first predetermined time, determines whether or not fraudulent transmission data is contained in the received data, and a third determination unit that, based on whether or not a time from a reference timing that is different from that of the determination unit 50 until the first predetermined number of data items are received by the receiving unit 44 is less than the first predetermined time, determines whether or not fraudulent transmission data is contained in the received data. As a result, even if fluctuations occur in the normal data reception time intervals, because it is likely that a correct determination result will be obtained in one of the above-described determination units 50, it is possible to inhibit incorrect determinations about receptions of fraudulent transmission data from occurring.

In the present exemplary embodiment, because there is further provided the control unit 52 that, when it is determined in one of the plural determination units 50 that fraudulent transmission data is contained in the received data, transitions to safety control so as to inhibit any effects from the fraudulent transmission data, it is possible to inhibit the effects of fraudulent transmission data.

In the present exemplary embodiment, because the plural determination units 50 and the control unit 52 are provided in the hub ECU 12 to which the plural communication buses 16A, 16B, and 16C are connected and, when it is determined in one of the plural determination units 50 that fraudulent transmission data is contained in the received data, the object of the safety control performed by the control unit 52 is the communication bus 16 to which the fraudulent transmission data was transmitted, there is no longer any need to alter the structure of the terminal ECU when the present disclosure is applied.

In the present exemplary embodiment, because the monitoring of whether or not fraudulent transmission data is contained in received data is performed on data that is transmitted via communication that conforms with CAN, in an environment in which communication that is compliant with CAN is performed, in other words, in an environment in which it is easy for fluctuations to consistently occur in normal data reception time intervals, it is possible to inhibit incorrect determinations relating to the reception of fraudulent transmission data from occurring.

In the foregoing description, a description is given of mode in which the data monitoring unit 42 is provided in the hub ECU 12, however, the present disclosure is not limited to this. For example, as illustrated in FIG. 6, it is also possible to store a data monitoring program 36 in the storage unit 24 of each one of the terminal ECU 14 so as to cause each terminal ECU 14 to function as a data monitoring unit 42, and to then determine whether or not fraudulent transmission data is contained in the data received by each terminal ECU 14. An example of the safety control performed in this mode is control in which the host ECU (i.e., one of the terminal ECU 14) that includes the determination unit 50 which has determined that fraudulent transmission data is contained in received data is temporarily prevented from functioning. Compared with a mode in which the data monitoring unit 42 is provided in the hub ECU 12, this mode enables the load on the hub ECU 12 to be dispersed over the plural terminal ECU 14.

In the foregoing description, the reference timing is taken as the timing when the i-th data item was received, however, the present disclosure is not limited to this and it is also possible for the reference timing to be set with no connection to data reception timings.

In the foregoing description, CAN is described as an example of a communication protocol, however, the present disclosure is not limited to this and may also be applied to various known communication protocols that transmit data in cycles.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A fraudulent transmission data detection device, comprising:
   a memory;
   a receiving unit that receives data that is transmitted in cycles; and
   a processor coupled to the memory and configured to function as:
   a plurality of determination units, each of which is configured to, based on whether or not a time from a reference timing until a predetermined number of data items are received by the receiving unit is less than a predetermined time, determine whether or not fraudulent transmission data is contained in the received data, and in which at least the reference timing, or the predetermined number of data items and the predetermined time, are different from those of the other determination units.

2. The fraudulent transmission data detection device according to claim 1, wherein the determination units comprise:
   a first determination unit that, based on whether or not a time, from a reference timing until a first predetermined number of data items are received by the receiving unit, is less than a first predetermined time, determines whether or not fraudulent transmission data is contained in the received data; and
   a second determination unit that, based on whether or not a time, from the reference timing until a second predetermined number of data items, which is different from the first predetermined number of data items, are received by the receiving unit, is less than a second predetermined time that is different from the first predetermined time, determines whether or not fraudulent transmission data is contained in the received data.

3. The fraudulent transmission data detection device according to claim 1, wherein the determination units comprise:
   a first determination unit that, based on whether or not a time, from a first reference timing until a first predetermined number of data items are received by the receiving unit, is less than a first predetermined time, determines whether or not fraudulent transmission data is contained in the received data; and
   a third determination unit that, based on whether or not a time, from a second reference timing, which is different from the first reference timing, of the first determination unit until the first predetermined number of data items are received by the receiving unit, is less than the first predetermined time, determines whether or not fraudulent transmission data is contained in the received data.

4. The fraudulent transmission data detection device according to claim 1, wherein the processor is further configured to, in a case in which it is determined by one of the plurality of determination units that fraudulent transmission data is contained in the received data, transition to safety control so as to inhibit any effects from the fraudulent transmission data.

5. The fraudulent transmission data detection device according to claim 4, wherein:
   the processor is provided in a hub ECU to which are connected a plurality of communication buses, and,
   in a case in which it is determined by one of the plurality of determination units that fraudulent transmission data is contained in the received data, the safety control is performed with respect to the communication bus to which the fraudulent transmission data has been transmitted.

6. The fraudulent transmission data detection device according to claim 4, wherein:
   the processor is provided at a terminal ECU to which is connected a single communication bus, and,
   in a case in which it is determined by one of the plurality of determination units that fraudulent transmission data is contained in the received data, the safety control is performed with respect to the terminal ECU at which the processor is itself provided.

7. The fraudulent transmission data detection device according to claim 1, wherein the data that is transmitted in cycles is transmitted via communication compliant with CAN.

8. A fraudulent data transmission method, comprising:
   receiving data that is transmitted in cycles;
   providing a plurality of determination circuits, each of which is configured to determine whether or not fraudulent transmission data is contained in the received data, based on whether or not a time from a reference timing until a predetermined number of data items are received is less than a predetermined time; and
   causing at least the reference timing, or the predetermined number of data items and the predetermined time, to be different at each of the plurality of determination circuits.

9. The fraudulent transmission data detection method according to claim 8, wherein the plurality of determination circuits comprise:
   a first determination circuit that, based on whether or not a time, from a reference timing until a first predetermined number of data items are received by the receiving unit, is less than a first predetermined time, determines whether or not fraudulent transmission data is contained in the received data; and
   a second determination circuit that, based on whether or not a time, from the reference timing until a second predetermined number of data items, which is different from the first predetermined number of data items, are received by the receiving unit, is less than a second predetermined time that is different from the first predetermined time, determines whether or not fraudulent transmission data is contained in the received data.

10. The fraudulent transmission data detection method according to claim 8, wherein the plurality of determination circuits comprise:
    a first determination unit that, based on whether or not a time, from a first reference timing until a first predetermined number of data items are received by the receiving unit, is less than a first predetermined time, determines whether or not fraudulent transmission data is contained in the received data; and
    a third determination unit that, based on whether or not a time, from a second reference timing, which is different from the first reference timing, of the first determination unit until the first predetermined number of data items are received by the receiving unit, is less than the first predetermined time, determines whether or not fraudulent transmission data is contained in the received data.

11. The fraudulent transmission data detection method according to claim 8, further comprising, in a case in which it is determined by one of the plurality of determination circuits that fraudulent transmission data is contained in the received data, performing safety control so as to inhibit any effects from the fraudulent transmission data.

12. The fraudulent transmission data detection method according to claim 8, wherein the data that is transmitted in cycles is transmitted via communication that is compliant with CAN.

13. A non-transitory storage medium storing a program that causes a computer to execute fraudulent data detection processing, the fraudulent data detection processing comprising:
 receiving data that is transmitted in cycles;
 providing a plurality of determination circuits, each of which is configured to, based on whether or not a time, from a reference timing until a predetermined number of data items are received, is less than a predetermined time, determine whether or not fraudulent transmission data is contained in the received data; and
 causing at least the reference timing, or the predetermined number of data items and the predetermined time, to be different at each of the plurality of determination circuits.

* * * * *